F. A. LEMICH.
CLAMPING BOLT.
APPLICATION FILED DEC. 29, 1920.

1,414,089.

Patented Apr. 25, 1922.

INVENTOR
FREDERICK A. LEMICH
BY Chas E. Townsend
ATTORNEY

UNITED STATES PATENT OFFICE.

FREDERICK A. LEMICH, OF LOS ANGELES, CALIFORNIA.

CLAMPING BOLT.

1,414,089.   Specification of Letters Patent.   Patented Apr. 25, 1922.

Original application filed March 3, 1920, Serial No. 362,902. Divided and this application filed December 29, 1920. Serial No. 433,849.

*To all whom it may concern:*

Be it known that I, FREDERICK A. LEMICH, a citizen of the United States, residing at Los Angeles, in the county of Los Angeles and State of California, have invented new and useful Improvements in Clamping Bolts, of which the following is a specification.

This invention relates to a threadless clamping bolt and is a division of my co-pending application entitled, "Method of drawing up and clamping steel plates, etc., and apparatus therefor," filed March 3, 1920, Serial No. 362,902.

In ship yards and in many allied trades it happens that much of the material handled must be temporarily clamped or bolted into position before the plates can be permanently riveted, or otherwise secured in place. This is particularly true of ship or hull construction. The temporary work of placing and bolting the plates in position on the framework of a ship is known as bolting up. Ordinary bolts and nuts are employed for this purpose. They are inserted by one man and the nut is then applied and tightened up by a second man positioned on the opposite side of the plate. The plates when temporarily bolted up often remain so secured for days and weeks, and as the whole hull is exposed to wind and weather, it can readily be seen that the temporary fastening means, to-wit, the bolts and nuts are very liable to set and rust. In fact it often happens that the nuts become so permanently set that hammers and chisels have to be employed in removing the same, thus damaging the bolts and nuts to such an extent that re-use is often out of the question. Tons of bolts and nuts are destroyed annually in most ship yards and is the source of considerable waste and expense, both in regard to labor and material, that is considerable time is wasted both in applying and removing the temporary fastening means, and as the fastening means or the bolts are to a certain extent destroyed, it should be obvious that unnecessary waste of material takes place.

The object of the present invention is to reduce the waste of bolts and nuts referred to by providing a special clamping bolt which can be quickly applied and removed, which is not affected by rust or weather conditions, not subject to damage either during application or removal, and which entirely eliminates the use of threads and nuts.

Further objects will hereinafter appear.

The invention consists of the parts and the construction, combination and arrangement of parts as hereinafter more fully described and claimed, having reference to the accompanying drawings, in which—

Figure 1:
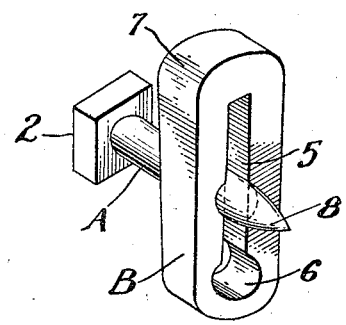
Fig. 1 is a perspective view of the clamping bolt and the wedge plate employed in conjunction therewith.

Referring to the drawings in detail, A indicates an ordinary bolt which may be square or round in cross section as here shown. Formed on one end of the bolt is a head member 2, and formed on the opposite end of the bolt is a pair of opposed V-shaped notches 3 which form shoulders 4. Adapted to cooperate with the bolt is a wedge plate generally indicated at B. This plate is substantially rectangular-shaped and is provided with an elongated slot 5, the lower end of which is enlarged as at 6 to permit the bolt to be passed therethrough. The wedge plate tapers from end to end as shown in Fig. 1, being heaviest at the upper end as indicated at 7. The slot formed at 5 also tapers to fit the V-shaped notches formed in the bolt, such taper being provided to permit a snug fit and cooperation of the bolt and wedge, and to materially increase the strength of both.

Figure 2:
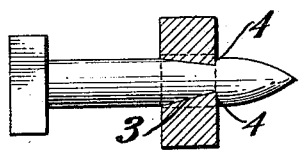
Fig. 2 is a cross section of the wedge plate showing it in position on the bolt.
Figure 3:
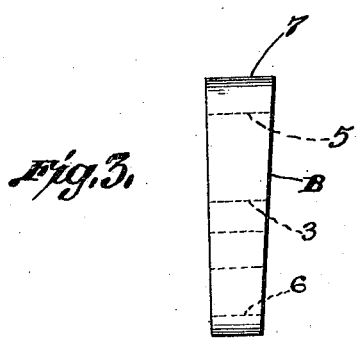
Fig. 3 is a side elevation of the wedge plate.

In actual operation when bolting up plates, for instance on board a ship, it is first necessary to lift the plates in position, then to draw the plates tightly together, and finally to temporarily secure them when tightly drawn up by bolts of suitable construction; the usual practice being to employ ordinary threaded bolts and nuts. In the present instance when the plates are drawn together and ready for bolting up, it is only necessary to insert the bolt shown in Figs. 1 and 2, that is the bolt is passed through the aligned rivet holes formed in the plates. The wedge is then applied by slipping it endwise over the pointed end of the bolt indicated at 8, and then dropping it down when the slot 5 registers with the shoulders 4. The wedge is then driven tightly into position by striking it on the upper heavy end 7 by means of a hammer or similar tool. As many bolts and wedging plates may be applied as is necessary and these are permitted to remain in position until actual riveting is commenced.

By referring to the drawings and the description of the same, it should be obvious that the time required when bolting up is materially reduced when comparison is made with other forms of bolts, and particularly ordinary screw bolts. For instance when bolting up with screw bolts and nuts, it is necessary that one man hold the head of the bolt with a wrench, while the other man is applying and tightening up the nut. Two men are necessarily required for this operation and the time employed is of course considerable when compared with the application of the clamping bolt shown in this instance; similarly, removal of ordinary bolts and nuts, particularly if they have become more or less set or rusty, often requires the use of hammers, chisels, etc., and just as often results in damage to the bolts and nuts of such a nature that re-use is impossible. This causes loss of time and material, and unnecessary expense in regard to labor. The present clamping bolts are not affected by rust, etc., and the time required for the application or removal of the same is very small when compared with the screw bolts just described. For instance when removing the clamping bolts employed in this instance, it is accomplished by slightly tapping the wedge plate on the lower side, such tapping relieves the wedge plate and permits it to be freely and quickly removed.

Having thus described my invention, what I claim and desire to secure by Letters Patent is—

A clamping bolt comprising a bolt having a head member formed on one end, a pair of opposed V-shaped notches formed on the opposite end of the bolt and presenting shoulder members, a wedge plate cooperating with the bolt, said plate being substantially rectangular in shape and tapering from end to end, an enlarged opening formed in one end of the plate, through which the bolt may be inserted, and an elongated slot formed in the wedge plate and communicating with the enlarged opening, the walls of said slot tapering to fit the V-shaped notches formed in the bolt.

FREDERICK A. LEMICH.

Witness:
E. D. CAVENDER.